UNITED STATES PATENT OFFICE.

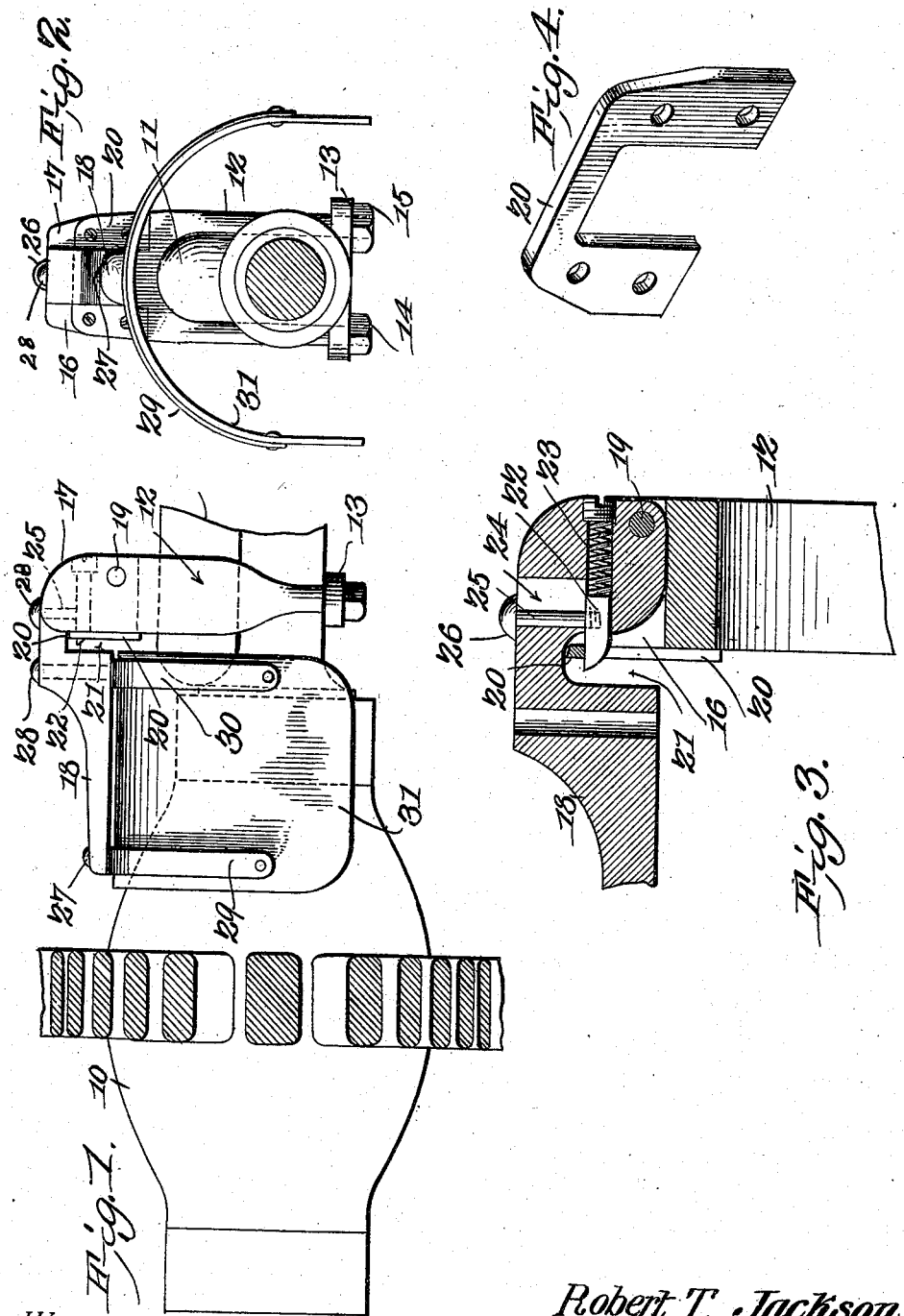

ROBERT T. JACKSON, OF MAGNOLIA, ARKANSAS.

MUD AND SAND GUARD FOR VEHICLE-WHEELS.

No. 840,494.          Specification of Letters Patent.          Patented Jan. 8, 1907.

Application filed May 24, 1906. Serial No. 318,573.

*To all whom it may concern:*

Be it known that I, ROBERT T. JACKSON, a citizen of the United States, residing at Magnolia, in the county of Columbia and State of Arkansas, have invented a new and useful Mud and Sand Guard for Vehicle-Wheels, of which the following is a specification.

This invention relates to attachments for the hubs of vehicle-wheels for excluding sand, mud, and other foreign matter, and has for its object to improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawings, Figure 1 is a side view of a vehicle-hub and portions of the spokes and a portion of the axle with the improved device applied. Fig. 2 is an end view of the parts shown in Fig. 1 with the hub removed and the axle-journal in transverse section. Fig. 3 is an enlarged sectional detail illustrating the construction of the joint between the guard and clip. Fig. 4 is a perspective view, enlarged, of the keeper-plate.

The improved device may be adapted to the hubs of vehicles of any form, but is more particularly adapted to the hubs of buggies and carriages and for the purpose of illustration is shown applied to a hub 10 and its axle 11 of this class.

The improved device comprises a clip 12, adapted to be attached to the axle 11 by a clamp-bar 13 and nuts 14 15 and extended upwardly and provided with spaced ears 16 17, between which an arm 18 is pivoted at 19. The clip 12 is provided with a transverse keeper-plate 20, and the arm 18 is provided with a recess 21, bearing over the plate when the arm is disposed in its lower position. The arm 18 is provided with a bolt 22, actuated by a spring 23 and bearing beneath the keeper 20 when the arm is in closed position, and thus locking the arm closed, as in Figs. 1 and 3. The arm 18 is likewise provided with a slot 24, through which an operating-pin 25 extends from the bolt, the pin having a knob 26 at its outer end with which to operate the bolt to release it from engagement with the keeper. The terminal of the bolt is inclined at one side, so that the arm may be "snapped" into engagement with the clip. Attached, as by rivets 27 28, to the arm 18 are metal bows or curved straps 29 30, the straps forming the supports for a guard 31, preferably of leather or like material, and extending over the rear or inner portion of the hub 10 when the arm is in closed position, as in Figs. 1 and 2. By this arrangement the hub 10 is effectually protected from mud, sand, or other foreign substance falling from the wheel as it rotates and no danger exists of such material finding its way to the axle-journal.

The device may be quickly attached to and detached from the axle and wheel and adjusted thereon to adapt it to the hub. When the journal is to be lubricated, the knob 26 is pressed rearwardly to release the bolt 22 from the keeper 20 and permit the arm 18, with its attached cap or guard 31, to be turned back out of the way. The sides of the cap member are vertical, as shown in Fig. 2, so that nothing can lodge thereon, which is of great advantage in devices of this character.

Having thus described the invention, what is claimed is—

1. In a device of the class described, a member having means for attachment to an axle, a keeper connected to said member, an arm swinging from said member and provided with a guard for bearing over the adjacent hub, a spring-pressed bolt carried by said arm and yieldably engaging said keeper and means for releasing said bolt.

2. In a device of the class described, a member having means for attachment to an axle and provided with spaced ears, a keeper extending transversely to said ears, an arm swinging between said ears and provided with a recess bearing over said keeper, a cap member connected to said arm for bearing over the hub and a spring-pressed bolt carried by said arm and yieldably engaging said keeper.

3. In a device of the class described, a member having means for attachment to an axle, a keeper connected to said member, an arm swinging from said member, curved straps spaced apart and connected to said arm, a curved guard member connected to said straps for bearing over the hub, a spring-pressed bolt carried by said arm and yieldably engaging said keeper.

In testimony that I claim the foregoing as my own I have hereto affixed my signature in the presence of two witnesses.

ROBERT T. JACKSON.

Witnesses:
A. A. WALKER,
R. B. VAUGHAN.